UNITED STATES PATENT OFFICE.

HERBERT T. KALMUS AND WALTER L. SAVELL, OF KINGSTON, ONTARIO, CANADA, ASSIGNORS TO SAID KALMUS.

METHOD OF MAKING ALUMINA.

1,090,479.   Specification of Letters Patent.   Patented Mar. 17, 1914.

No Drawing.   Application filed June 14, 1913. Serial No. 778,734.

*To all whom it may concern:*

Be it known that we, HERBERT T. KALMUS and WALTER L. SAVELL, citizens of the United States, both residing at Kingston, in the county of Frontenac, Province of Ontario, and Dominion of Canada, have invented certain new and useful Improvements in Methods of Making Alumina; and we do hereby declare the following to be a full, clear, and exact description of the invention, such as will enable others skilled in the art to which it appertains to make and use the same.

The present invention relates to a process of obtaining alumina from aluminous materials, and more particularly to a process of obtaining alumina from nephelin syenite.

The principal object of the invention is to reduce the cost of producing alumina suitable for use in the manufacture of abrasives and aluminium, the metal, and to this end the invention consists in the process hereinafter described and particularly pointed out in the claims.

The process is particularly applicable to obtaining alumina from nephelin syenite. This process may also be used with other aluminous materials hereinafter identified. The process will be described as it has been practised to obtain alumina from nephelin syenite.

The ore, nephelin syenite, is first ground to a fine powder. The pulverized ore is then sulfited by a treatment with sulfur dioxid. The sulfur dioxid treatment is carried out at ordinary room temperatures, and during this treatment, the mass is agitated to assist the chemical reactions. The pulverized ore is put in a tank and covered with about three times its weight of water and agitated, at the same time passing in sulfur dioxid gas. There should be an excess of sulfur dioxid which may be had by passing an excess of sulfur dioxid gas into the water during this treatment. The nephelin syenite contains silica, soda, potassium oxid, alumina, oxids of iron and the like. The sulfur dioxid converts the alumina into a complex, unstable, soluble compound containing aluminium oxid and sulfur dioxid having the general nature of aluminium sulfite. The sulfur dioxid and water converts the other compounds, such as soda, potassium oxid, oxids of iron, and the like, into relatively stable, soluble compounds containing sulfur dioxid of the general nature of sulfites. A large portion of the silica, which is released by the breaking down of the silicates, stays in solution probably as a hydrated silicic acid. At the end of this treatment a large portion of the ore has been dissolved, leaving an insoluble residue, which consists largely of silica. The solution is separated from the insoluble residue by filtration.

The next step consists in desulfiting the solution to cause precipitation of the alumina. This is accomplished by heating the solution to a temperature of about 55° C. and subjecting it to moderate agitation. Steam is introduced for heating the solution, and it is agitated by stirring. The result of this treatment is the evolution of sulfur dioxid gas from the solution. The alumina, which is released by the desulfiting process, is precipitated as aluminium hydrate. The precipitated aluminium hydrate is not pure aluminium hydrate, but contains a small amount of sulfur dioxid compounds of aluminium of the general nature of basic aluminium sulfite or aluminium sulfite. This precipitate of aluminium hydrate with the accompanying sulfur dioxid compounds is sometimes spoken of as basic aluminium sulfite. Therefore, when the expression "aluminium hydrate" is used in the specification and claims, it is to be understood that the precipitate defined thereby is not necessarily pure aluminium hydrate but may contain sulfur dioxid compounds of aluminium. During this desulfiting process, the soluble silica is largely precipitated as hydrous silica. The result of the desulfiting treatment is, therefore, the precipitation from the solution of aluminium hydrate, together with hydrous silica, while the stable compounds of the other elements remain in solution.

The precipitate obtained by the desulfiting process is separated from the solution by filtration, and the separated precipitate, which consists of aluminium hydrate and hydrous silica, is resulfited by being again treated with sulfur dioxid and water in a manner similar to the former treatment of the ore, but, however, with as little water as possible. The aluminium hydrate is converted by the excess of sulfur dioxid into the unstable compound of aluminium oxid and sulfur dioxid which has the general character of aluminium sulfite. The precipitated hydrous silica is, however, for the most part, not redissolved by the sulfur dioxid, but remains as an insoluble residue. The insoluble residue of hydrous silica is separated from the solution containing the aluminium oxid and sulfur dioxid by means of filtration. The residue is practically pure hydrous silica and may form a valuable by-product. The filtered solution is next desulfited by heating and agitation as before to precipitate the alumina as aluminium hydrate, together with any silica which may have been redissolved during the resulfiting process. The precipitated aluminium hydrate is separated from the solution by filtration. The aluminium hydrate thus obtained is dehydrated by calcining. When an appreciable amount of basic aluminium sulfite is present, the precipitate is roasted to drive off the sulfur content. As the aluminium hydrate is readily dehydrated and the hydrate converted to the oxid by the loss of water, and as basic aluminium sulfite is readily decomposed by heat and converted into the oxid with the loss of its sulfur content, the term "alumina", as used in the specification and claims, is intended to include not only the pure dehydrated or dry aluminium oxid, but also the aluminium oxid which is combined with water to form the aluminium hydrate, or hydrated alumina and basic aluminium sulfite. As above pointed out, the alumina obtained by this method may contain a small amount of silica which was redissolved during the resulfiting operation and precipitated with the aluminium hydrate during the subsequent desulfiting operation. The amount of silica present as an impurity in the alumina obtained as the final product varies with the character of the ore, the concentration of the solutions, etc. The term "alumina" as applied to the product obtained by this method is not to be understood as restricted to pure alumina, but as inclusive of more or less impure or crude alumina, such as alumina containing a small amount of silica. The term "silica" is used in the claims as inclusive of silica ($SiO_2$), silica hydrate, hydrated silica, silicic acid and like compounds of silicon.

The foregoing description of the preferred method of obtaining alumina from aluminous ores of the class described specifically sets forth the precise method which has been practised. The invention is not limited to this precise method hereinbefore described, as the invention is of broader aspect. In the first place, the method is not limited to use in connection with any particular aluminous ore or material. The method is, however, particularly applicable to making alumina from ores which lend themselves readily to the sulfiting process with only preliminary grinding. Nephelin syenite is one of these ores; others are sodalite and certain kaolins. The method may also be used on other materials, such as ores, minerals or substances which have been rendered sulfitable by preliminary treatment. All of these things are referred to herein as sulfitable materials.

The sulfiting treatment may be carried out by treating the ore with a previously prepared solution of sulfurous acid, or the ore may be agitated in a previously prepared sulfurous acid solution, the strength of which is renewed by passing sulfur dioxid gas into the water. The treatment of the ore with the sulfur dioxid and water is preferably carried out at atmospheric pressure. This sulfiting treatment may, however, be carried out at higher pressures.

While in the preferred method of sulfiting the ore, water to an amount equal to three times the weight of the ore is used and in subsequent sulfiting operations only a small amount of water is used, the invention, in its broader aspects, is not limited to these proportions. With certain ores, it is preferred to heat the precipitate formed during the first desulfiting operation to a temperature of about 120° C. for a length of time sufficient to partially dehydrate the silica before subjecting this precipitate to the sulfiting process. This partial dehydrating renders the silica less soluble.

While under ordinary circumstances, the single repetition of the sulfiting and desulfiting operations is sufficient, under some circumstances it is desirable to sulfite and desulfite more times in order to obtain alumina of the highest purity.

By selecting suitable ores and by carrying out the method with that end in view, it is possible to obtain alumina substantially free from silica. With other ores, or in making products in which some silica is not objectionable, several per cent. of silica may be present as an impurity in the alumina.

The expression "sulfur dioxid and water," as used in the specification and claims, is intended to define any compound or mixture of sulfur dioxid ($SO_2$) and water ($H_2O$) whether in the compound expressed by the formula $H_2SO_3$ (sulfurous acid) or not.

The separation of the soluble sulfites from the insoluble residue after the sulfiting operations, has been referred to as a process of filtration, and for this purpose a filter, centrifugal machine or other apparatus may be employed.

The desulfiting operation in the preferred embodiment is accomplished by heating and stirring the mixture. This is the preferred method of desulfiting by reason of its cheapness and efficiency. This operation may be accomplished at temperatures as low as 35° C. with vigorous agitation, or at the boiling temperature without recourse to agitation. The object of this step is to deprive the solution of the sulfur dioxid, and the desulfiting may be accomplished either by heating or by exhaustion. Thus, while the sulfiting operation is, or may be, carried on at atmospheric pressure, the desulfiting operation may be carried on by simply exhausting the chamber containing the sulfite solutions. This has substantially the same effect in removing the sulfur dioxid as heating. While under ordinary conditions of plant equipment, the employment of heat would probably be most economical, under other conditions the employment of vacuum might be preferred. As, for example, where waste power was available which otherwise would not be used, it could be employed to exhaust the vessel for the purpose of throwing down the alumina. It is to be understood that it is within the contemplation of the invention to practice the desulfiting operations by simply boiling the sulfite solution, although it is preferred to keep the temperature as low as possible and to rely on agitation because the latter is cheaper and because there is less liability of oxidizing the sulfites to sulfates, and less liability of getting iron in with the precipitate. The foregoing methods of desulfiting may be referred to as physical methods of desulfiting, but the invention is not limited to these methods as the operation may be accomplished by chemical methods, such as by the use of certain chemical reagents which have a radical of greater affinity than the aluminium for the sulfur dioxid. Examples of such reagents are found in the salts of alkali, or alkaline earth metals, such as the hydrate, carbonate or sulfids which will form relatively stable, soluble salts with the sulfur dioxid, and so break down the unstable compound of aluminium oxid and sulfur dioxid and precipitate the alumina. It is desirable that the sulfur dioxid used in the sulfiting operations should be free from sulfur trioxid so that no aluminium sulfate shall be formed during the sulfiting operations, and the entire aluminous content of the ore may be obtained. In this connection it is to be pointed out that during the desulfiting operations, it is desirable that free access of air to the solution be prevented, and that the temperature be raised to a point just sufficient to precipitate the alumina as aluminium hydrate, so that the ferrous compounds are not oxidized to ferric compounds and the precipitate is practically free from iron.

Referring to the agitation of the solution during the desulfiting operations, it is within the contemplation of the invention to agitate the solution by blowing in air which not only agitates the solution but helps to carry off the $SO_2$ gas. But this is not preferred because it is liable to result in partially oxidizing the sulfites to sulfates.

In practising this method of obtaining alumina commercially, various economies are practised, and one which is not without effecting a saving worth while, contemplates the recovery and re-use of the sulfur dioxid which is removed during the desulfiting operations. Another feature of the present invention which contributes to reducing the expense of practising the process resides in the valuable by-products. The most important of these by-products are sodium sulfite, sodium hydrate, sodium hypo-sulfite and sulfur, which are produced from the solvent liquor used in the first sulfiting operation and which may be repeatedly used until it has become sufficiently concentrated to be available in the manufacture of sodium hypo-sulfite and sulfur. Another by-product is the hydrous silica remaining after the second sulfiting operation. This has commercial value and its production decreases the cost of producing the alumina.

A feature of this method which is of importance is that the extremely inexpensive nature of the process permits the treatment of ores from which only a portion of the alumina is recovered. For example, it is commercially practical to treat ores running 30 and 35% alumina with this process when only two-thirds of this alumina, or about 20% of the total ore, is extracted. Much depends upon the ore; with ores lending themselves with greatest adaptability to the process, substantially all the aluminium is extracted; with other more obdurate ores, the process is so inexpensive that even they are available for its use.

It is desired to emphasize the fact that the only reagent employed in the sulfiting operations is an inexpensive one, namely, sulfur dioxid, so that the process is capable of being practised at extraordinarily low cost. Not only is the process cheap by reason of the inexpensiveness of this reagent, but also by reason of the simplicity and inexpensiveness of the heating, stirring and filtering operations employed.

What is claimed is:—

1. The method of making alumina which consists in subjecting sulfitable aluminous materials to a sulfiting operation by the action of sulfur dioxid and water to transform alumina content into a relatively unstable soluble compound or compounds of alumina and sulfur dioxid, and in desulfiting the solution to break down the unstable compound or compounds of alumina and sulfur dioxid and precipitate alumina from the solution, substantially as described.

2. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid, with which is present some dissolved silica, in desulfiting the solution to break down the unstable compound or compounds of alumina and sulfur dioxid and precipitate alumina and silica from the solution, in resulfiting the precipitate by the action of sulfur dioxid and water to transform alumina into a relatively unstable soluble compound or compounds of alumina and sulfur dioxid leaving silica undissolved, and in desulfiting the solution to break down the unstable compound or compounds of alumina and sulfur dioxid and precipitate alumina from the solution, substantially as described.

3. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid, with which is present some dissolved silica, in desulfiting the solution to break down the unstable compound or compounds of alumina and sulfur dioxid and precipitate alumina and silica from the solution, in resulfiting the precipitate by the action of sulfur dioxid and a small amount of water to transform alumina into a relatively unstable soluble compound or compounds of alumina and sulfur dioxid leaving substantially all of the silica undissolved, and in desulfiting the solution to break down the unstable compound or compounds of alumina and sulfur dioxid and precipitate alumina from the solution, substantially as described.

4. The method of making alumina which consists in subjecting sulfitable aluminous materials to a sulfiting operation wherein the materials in the presence of water are acted upon by sulfur dioxid gas passed into the mixture to transform alumina content into a relatively unstable soluble compound or compounds of alumina and sulfur dioxid, and in desulfiting the solution to break down the unstable compound or compounds of alumina and sulfur dioxid and precipitate alumina from the solution, substantially as described.

5. The method of making alumina which consists in subjecting sulfitable aluminous materials to a sulfiting operation by the action of sulfur dioxid and water to transform alumina content into a relatively unstable soluble compound or compounds of alumina and sulfur dioxid, and in desulfiting the solution by heating it to break down the unstable compound or compounds of alumina and sulfur dioxid and precipitate alumina from the solution, substantially as described.

6. The method of making alumina which consists in subjecting sulfitable aluminous materials to a sulfiting operation by the action of sulfur dioxid and water to transform alumina content into a relatively unstable soluble compound or compounds of alumina and sulfur dioxid, and in desulfiting the solution by heating and agitating it to break down the unstable compound or compounds of alumina and sulfur dioxid and precipitate alumina from the solution, substantially as described.

7. The method of making alumina which consists in subjecting sulfitable aluminous materials to a sulfiting operation by the action of sulfur dioxid and water to transform alumina content into a relatively unstable soluble compound or compounds of alumina and sulfur dioxid, and in desulfiting the solution by heating to a temperature of about 55° C. and agitating it to break down the unstable compound or compounds of alumina and sulfur dioxid and precipitate alumina from the solution, substantially as described.

8. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid, with which is present some dissolved silica, in filtering the mass to remove insoluble residue, in desulfiting the solution by heating and agitating it to break down the unstable compound or compounds of alumina and sulfur dioxid and precipitate alumina and silica from the solution, in filtering the mixture to remove the solution, in subjecting the precipitate to a second sulfiting operation by the action of sulfur dioxid and water to transform alumina into a relatively unstable soluble compound or compounds of alumina and sulfur dioxid leaving silica undissolved, in filtering the mixture to remove the undissolved silica, in desulfiting the solution by heating and agitating it to break down the unstable compound or compounds of alumina and sulfur dioxid and precipitate alumina from the solution, and in filtering the mixture to obtain the precipitated alumina, substantially as described.

9. The method of making alumina which consists in subjecting sulfitable aluminous and silicious materials to a sulfiting operation by the action of sulfur dioxid and water to transform alumina content into a relatively unstable, soluble compound or compounds of alumina and sulfur dioxid, with which is present some dissolved silica, in desulfiting the solution to break down the unstable compound or compounds of alumina and sulfur dioxid and precipitate alumina and silica from the solution, in heating the precipitate to render the silica less soluble, in resulfiting the precipitate by the action of sulfur dioxid and water to transform alumina into a relatively unstable, soluble compound or compounds of alumina and sulfur dioxid, leaving substantially all of the silica undissolved, and in desulfiting the solution to break down the unstable compound or compounds of alumina and sulfur dioxid and precipitate alumina from the solution, substantially as described.

10. The method of making alumina which consists in subjecting sulfitable aluminous and silicious materials to a sulfiting operation by the action of sulfur dioxid and water to transform alumina content into a relatively unstable, soluble compound or compounds of alumina and sulfur dioxid, with which is present some dissolved silica, in desulfiting the solution to break down the unstable compound or compounds of alumina and sulfur dioxid and precipitate alumina and silica from the solution, in heating the precipitate to about 120° C. to render the silica less soluble, in resulfiting the precipitate by the action of sulfur dioxid and water to transform alumina into a relatively unstable, soluble compound or compounds of alumina and sulfur dioxid, leaving substantially all of the silica undissolved, and in desulfiting the solution to break down the unstable compound or compounds of alumina and sulfur dioxid and precipitate alumina from the solution, substantially as described.

11. The method of making alumina which consists in subjecting sulfitable aluminous materials to a sulfiting operation by the action of sulfur dioxid and water to transform alumina content into a relatively unstable soluble compound or compounds of alumina and sulfur dioxid, and in desulfiting the solution by heat and exhaustion to break down the unstable compound or compounds of alumina and sulfur dioxid and precipitate alumina from the solution, substantially as described.

12. The method of making alumina which consists in subjecting sulfitable aluminous materials to a sulfiting operation by the action of sulfur dioxid and water to transform alumina content into a relatively unstable soluble compound or compounds of alumina and sulfur dioxid, and in desulfiting the solution by heat and exhaustion with agitation to break down the unstable compound or compounds of alumina and sulfur dioxid and precipitate alumina from the solution, substantially as described.

HERBERT T. KALMUS.
WALTER L. SAVELL.

Witnesses:
GEO. H. SMYTHE,
JESSIE V. CONNOR.